United States Patent
Sareen et al.

(10) Patent No.: US 7,568,044 B1
(45) Date of Patent: Jul. 28, 2009

(54) METHOD AND APPARATUS FOR IDENTIFYING THE CAUSE OF AN EVENT OCCURRING WITHIN A COMPUTER SYSTEM

(75) Inventors: Chaitanya Dev Sareen, Seattle, WA (US); Paul Daley, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 973 days.

(21) Appl. No.: 10/667,726

(22) Filed: Sep. 22, 2003

(51) Int. Cl.
*G06F 15/16* (2006.01)
(52) U.S. Cl. .................. 709/232; 709/206; 709/207
(58) Field of Classification Search ............. 709/207, 709/206, 232
See application file for complete search history.

(56) References Cited

U.S. PATENT DOCUMENTS

| | | | |
|---|---|---|---|
| 5,119,470 A | | 6/1992 | Highland et al. |
| 5,283,856 A | * | 2/1994 | Gross et al. .................. 706/47 |
| 5,442,793 A | | 8/1995 | Christian et al. |
| 6,260,148 B1 | | 7/2001 | Aggarwal et al. |
| 6,363,435 B1 | | 3/2002 | Fernando et al. |
| 6,473,745 B2 | | 10/2002 | Doerr et al. |
| 7,164,422 B1 | * | 1/2007 | Wholey et al. ........... 345/440.1 |

OTHER PUBLICATIONS

Tom Syroid and Bo Leuf, "Outlook 2000 in a Nutshell", Apr. 1, 2000, O'Reily.*
Hakala, D. et al., "You've got e-mail," *PC World* (*US Edition*), vol. 16, No. 6, 9 pgs. (Jun. 1998).
Hurwicz, M., "The Outlook for Exchange," *Workgroup Computing Report*, vol. 20, No. 12, pp. 3-28 (Dec. 1997).
Perets, A., "Using e-mail filters to increase efficiency," *Office Solutions*, vol. 18, No. 2, pp. 38-40 (Feb. 2001).
Pollock, S., "A Rule-Based Message Filter System," *ACM Transactions on Office Information Systems*, vol. 6, No. 3, pp. 232-254 (Jul. 1988).

* cited by examiner

*Primary Examiner*—William C Vaughn, Jr.
*Assistant Examiner*—Maceeh Anwari
(74) *Attorney, Agent, or Firm*—Merchant & Gould

(57) ABSTRACT

A method, apparatus, and computer-readable medium are provided for identifying to a user the cause of an event occurring within a computer system. According to one method, a rule is maintained at a computer system that includes one or more conditions and one or more actions that are performed when the conditions are satisfied. An evaluation is periodically performed to determine whether the conditions are satisfied. If the conditions are satisfied, the one or more actions are performed. A request may then be received to identify the cause of the performance of the actions. In response to such a request, the rule is identified, such as by identifying the rule within a user interface provided by the computer system.

20 Claims, 4 Drawing Sheets

METHOD AND APPARATUS FOR IDENTIFYING THE CAUSE OF AN EVENT OCCURRING WITHIN A COMPUTER SYSTEM

TECHNICAL FIELD

The invention generally relates to the field of event-driven systems and, more specifically, to the field of determining and identifying to a user the cause of an event occurring within a computer system.

BACKGROUND OF THE INVENTION

As the use of electronic mail ("e-mail") has become more and more pervasive, users have become inundated with an ever increasing volume of e-mail messages. In order to deal with the increased volume of e-mail messages, many users utilize e-mail client applications that support the use of e-mail handling rules. E-mail handling rules allow a user to define one or more conditions that should be tested for when an e-mail message is received. One or more corresponding actions may also be defined that are performed when e-mail messages are received that satisfy the conditions. For instance, an e-mail rule may be defined by a user that identifies incoming e-mail messages from a particular sender and moves any messages received from the sender to a particular folder for storage. As another example, an e-mail rule may be defined that identifies incoming e-mail messages that contain specific text in the subject line and then plays a particular sound when e-mail messages having matching text in the subject are received. Many other combinations of conditions and actions may be defined to handle e-mail messages in a virtually unlimited number of different ways.

Although e-mail handling rules provide a great deal of convenience for users, they are not without their drawbacks. In particular, one frustrating aspect of e-mail handling rules for users stems from the fact that it is often difficult for users to determine which of a number of rules caused a particular action, or event, to occur. For instance, an e-mail handling rule may be defined by a user that displays an on-screen message when an e-mail matching some specified conditions is received. However, when the on-screen message is displayed, there is no way for the user to identify the event, and in particular the e-mail handling rule, that caused the message to be displayed. This frustration may be compounded if the e-mail handling rule is pre-defined, as opposed to user-defined, or where the user has defined a large number of e-mail handling rules. It can be very difficult for a user to locate the cause of the event generated by the e-mail handling rule, to delete the rule, or to make changes to the rule that modify the actions that are performed when the rule conditions are satisfied.

It is with respect to these considerations and others that the various embodiments of the present invention have been made.

SUMMARY OF THE INVENTION

In accordance with the present invention, the above and other problems are solved by a method, apparatus, and computer-readable medium for identifying to a user the cause of an event that has occurred within a computer system. By utilizing the invention, a user can easily determine the cause of an event occurring within a computer system, such as the identity of an e-mail handling rule that caused the event to occur. Once the cause of the event has been identified to a user, the user can make changes to the conditions that cause the event to occur and the actions that are performed as a result of the occurrence of the conditions.

In accordance with other aspects of the present invention, a method is provided for identifying to a user the cause of an event, also referred to herein as an action, that has occurred within a computer system. In particular, according to the method, a rule is maintained at a computer system that includes one or more conditions and one or more actions that are performed when the conditions are satisfied. For instance, a rule may be defined that includes the condition of receiving an e-mail message and where the actions include displaying an indication that indicates that the e-mail message was received.

An evaluation is periodically performed by the computer system to determine whether the conditions have been satisfied. If the conditions are satisfied, the one or more actions specified by the rule are performed. For instance, if an e-mail message is received that satisfies the specified conditions, a notification may be displayed on a user interface provided by the computer system that indicates that the message has been received. A request may then be received to identify the cause of the performance of the actions. In response to such a request, the rule may be identified, such as by identifying the rule within a user interface provided by the computer system.

According to additional aspects of the methods provided herein, a facility is provided within a computer system that allows a user to define rules related to the handling of e-mail messages. Each rule includes one or more conditions and one or more actions to be performed if the specified conditions are satisfied. For instance, through the provided facility, a user can define a rule that causes an indication to be displayed on a display of the computer system in response to receiving an e-mail message that satisfies specified conditions. As a part of the displayed indication, a user interface object may be displayed that allows a user to retrieve the identity of the rule that caused the indication to be displayed. If the user interface object is selected by a user, another indication is provided that identifies the rule to the user.

The invention may be implemented as a computer process, a computing system, or as an article of manufacture such as a computer program product or computer readable media. The computer program product may be a computer storage media readable by a computer system and encoding a computer program of instructions for executing a computer process for providing the user interface. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE DRAWINGS

FIG. 2 is a flow diagram illustrating a process for; and

DETAILED DESCRIPTION OF THE INVENTION

Figure 1:
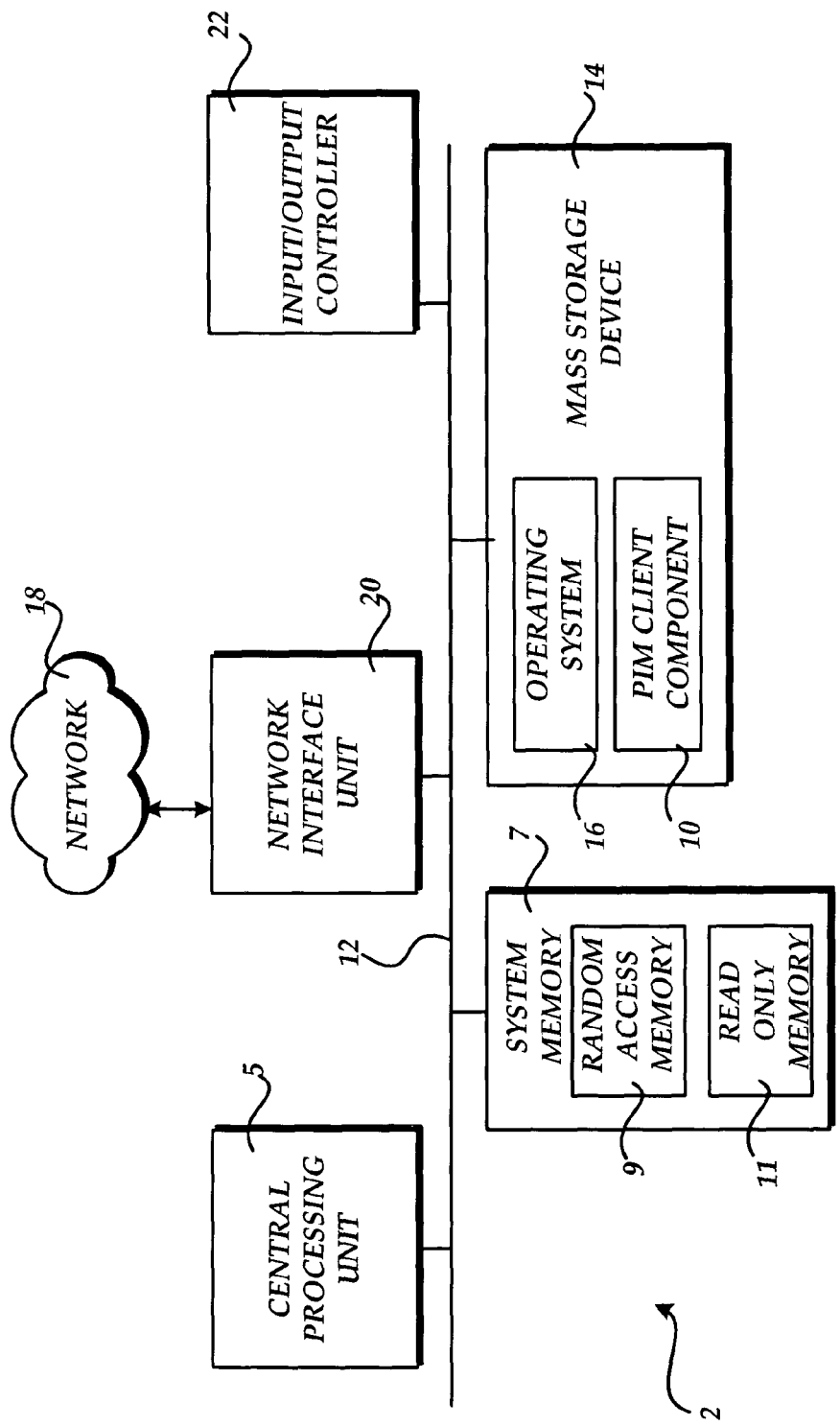
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system executing on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a client computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The client computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the client computer 2.

According to various embodiments of the invention, the client computer 2 may operate in a networked environment using logical connections to remote computers, such as an e-mail server computer, through a network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the client computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a personal information manager ("PIM") client component 10. The PIM client component 10 comprises an executable software component operative to provide functionality for managing personal information, including e-mail messages. According to one embodiment of the invention, the PIM client component 10 comprises the OUTLOOK messaging and PIM application from MICROSOFT CORPORATION of Redmond, Wash. It should be appreciated that embodiments of the invention may be implemented in other types of PIM and e-mail clients from other manufacturers.

As will be described in greater detail below, the PIM client component 10 includes functionality for creating and processing e-mail message handling rules. As known to those skilled in the art, e-mail message handling rules include two components: conditions that are tested for when an e-mail message is received and actions that are performed if each of the conditions are satisfied. For instance, conditions may be defined that are based upon the sender, recipients, subject, contents, or other characteristics of an e-mail message. Actions may be defined for moving the e-mail message to another folder, deleting the e-mail message, displaying a message, or performing other actions.

As will also be described in greater detail below, the PIM client component 10 includes functionality for allowing a user to easily identify the e-mail handling rule that caused a particular action, or event, to occur within the computer system. For instance, if an e-mail handling rule is created that causes a message, or indication, to be displayed if an e-mail message satisfying certain conditions is received, a user can easily identify the particular e-mail handling rule that caused the message to be displayed. Additional details regarding this process, and a user interface provided for implementing aspects of the process, are described in greater detail below with respect to FIGS. 2-4.

Figure 2:
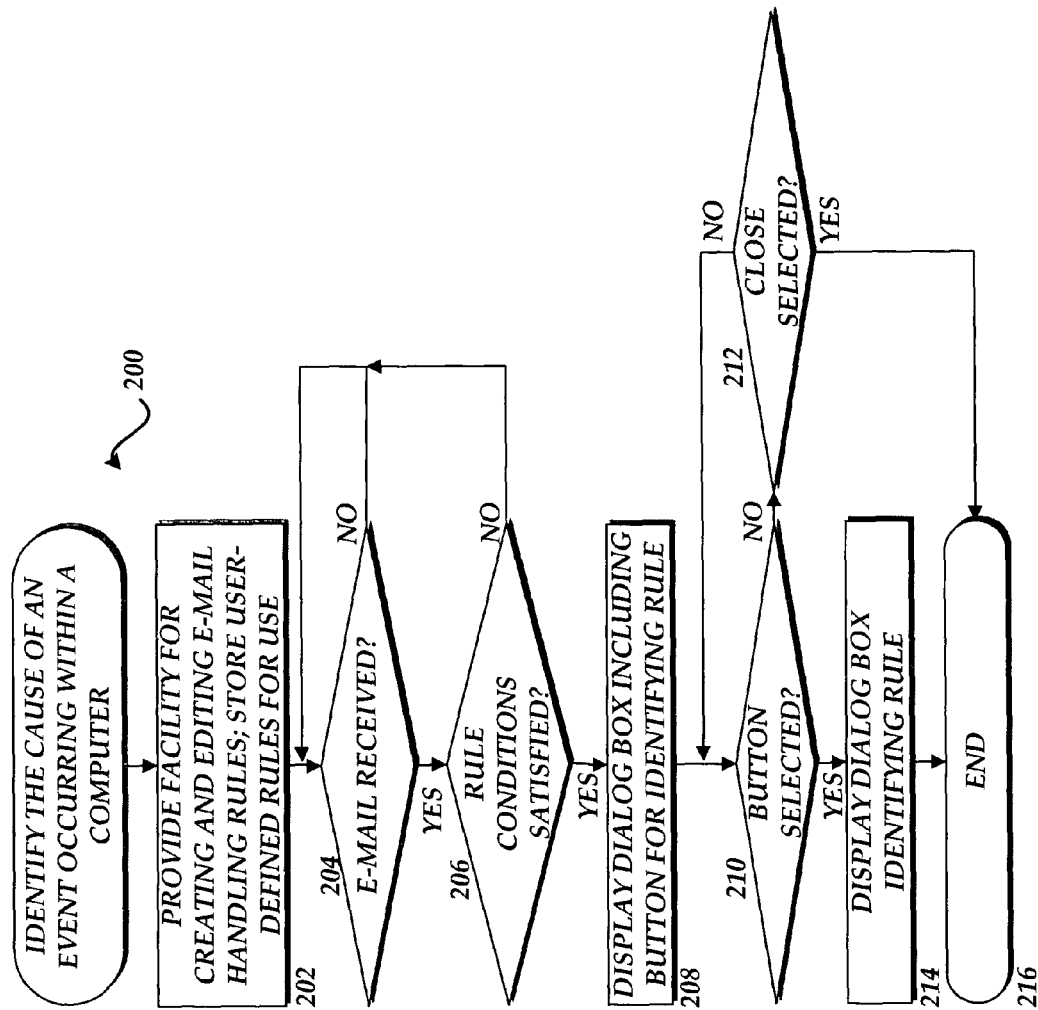
Figure 3:
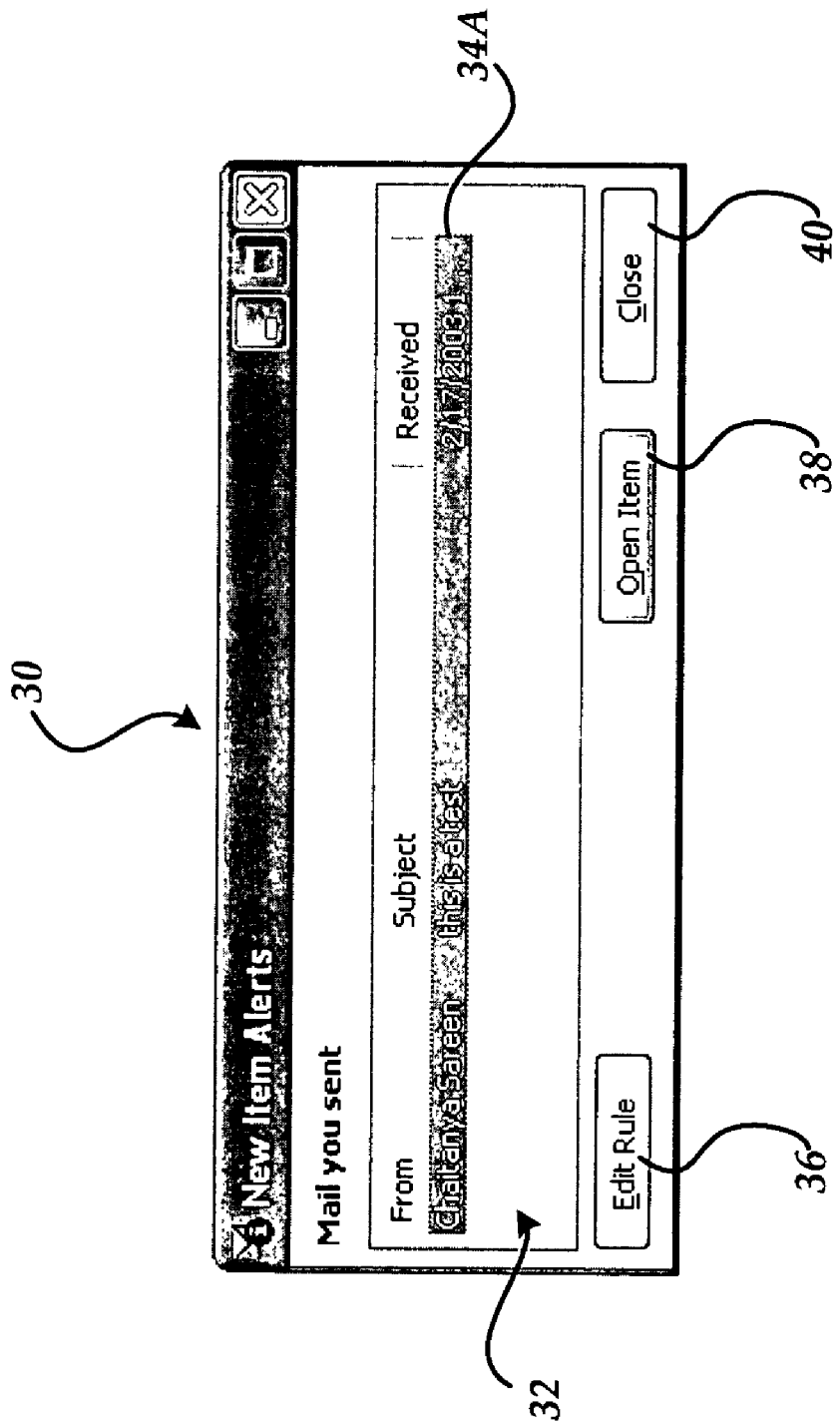
FIGS. 3-4 are screen diagrams illustrating various user interfaces and the features contained therein provided by the embodiments of the present invention.
Figure 4:
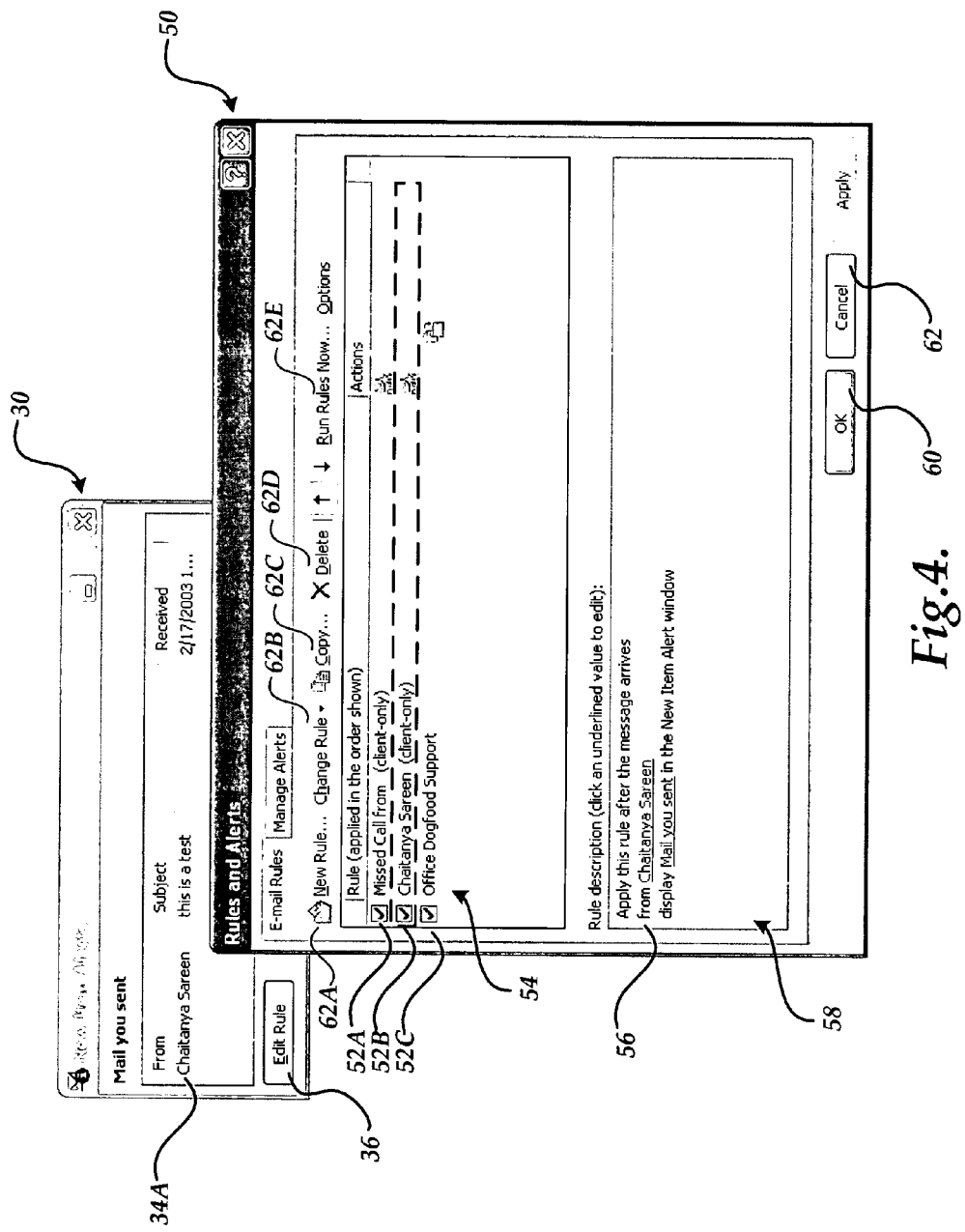

Referring now to FIGS. 2-4, a routine 200 will be described for identifying to a user the cause of an event that has occurred within a computer system. The routine 200 will be described in conjunction with the user interface diagrams illustrated in FIGS. 3 and 4. These diagrams show various user interfaces provided by and utilized in embodiments of the invention.

It should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 2 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

As shown in FIG. 2, the routine 200 begins at operation 202, where a facility is provided at the computer 2 for allowing a user to create and edit e-mail handling rules. The facility is provided by the PIM client component 10, but may also be provided by other software components executing within the computer 2. It should be appreciated that a user may define as many e-mail handling rules as the user desires. Moreover, some e-mail handling rules may be provided by a system administrator of the compute 2 or as "default" e-mail handling rules provided with the PIM client component 10.

As described briefly above, the PIM client component 10 also provides functionality for periodically evaluating the created e-mail handling rules to determine whether the conditions specified in the rules have been satisfied. In the e-mail context, the evaluation process typically begins when an e-mail message is received. Accordingly, from operation 202, the routine 200 continues to decision operation 204. At decision operation 204, the PIM client component 10 determines whether an e-mail message has been received. If an e-mail message has not been received, the routine 200 returns to operation 204, where another such decision is made. If, however, an e-mail message has been received, the routine 200 continues from decision operation 204 to decision operation 206.

At decision operation 206, the PIM client component 10 determines whether the conditions have been satisfied for any of the active e-mail handling rules. If all of the conditions for a particular e-mail handling rule have been satisfied, the PIM client component 10 is then operative to perform the actions associated with the rule. In particular, according to one embodiment, an e-mail handling rule may be defined that displays a message, or indication, on the display of the computer 2 in response to the receipt of an e-mail message satisfying the specified conditions for a rule. The displayed message may be displayed in any manner on the display of the computer 2, including displaying a user interface dialog box on the display screen that indicates that a new e-mail message has been received. This indication is displayed at operation 208 of the routine 200.

FIG. 3 shows an illustrative indication that may be displayed at operation 208 of the routine 200. In particular, FIG. 3 shows a user interface dialog box 30 that is displayed in response to the rule conditions being satisfied for a particular rule. The user interface dialog box 30 includes a list 32 identifying each of the e-mail messages 34A for which an indication has been displayed. For each e-mail message 34A identified, information relating to the message may be displayed in the dialog box 30. For instance, the sender of the message may be identified, the subject may be shown, and the time the e-mail message was received may also be displayed. Other information typically associated with an e-mail message may also be shown for each e-mail message in the list 32. It should be appreciated that although FIG. 3 shows only one e-mail message 34A in the list 32, multiple e-mail messages may be displayed in the list 32. Moreover, it should be appreciated that e-mail messages satisfying conditions for different rules may be displayed in the same list 32.

As illustrated in FIG. 3, any e-mail message identified in the list 32 may be selected by a user utilizing a mouse or other type of pointing device. Selection may also may be made with a keyboard. The selected e-mail message 34A may then be opened for viewing by selecting the "open item" user interface button 38. The user interface dialog box 30 may also be dismissed from the display of the computer 2 by selecting the "close" user interface button 40.

According to one embodiment of the invention, the user interface dialog box 30 also includes an "edit rule" user interface button 36. Selection of the button 36 allows a user to easily determine the rule that caused the user interface dialog box 30 to be displayed for the e-mail message 34A selected in the list 32. Accordingly, at decision operation 210 of the routine 200, a determination is made as to whether the "edit rule" user interface button 36 has been selected. If the button 36 has not been selected, the routine 200 branches from operation 210 to operation 212, where a determination is made as to whether the "close" user interface button 40 has been selected. If the button 40 has not been selected, the routine 200 returns to decision operation for another determination as to whether the button 36 has been selected. If the button 40 has been selected at operation 212, the dialog box 30 is dismissed and the routine 200 continues to operation 216, where it ends.

If, at operation 210, the PIM client component 10 determines that the "edit rule" user interface button 36 has been selected by a user, the routine 200 continues to operation 214. At operation 214, the PIM client component 10 displays the user interface dialog box 50, shown in FIG. 4. As illustrated in FIG. 4, the user interface dialog box 50 includes a list 54 identifying each of the e-mail handling rules 52A-52C in use by the PIM client component 10. Moreover, the rule that caused the user interface dialog box 30 to be displayed for the selected e-mail message 34A is highlighted, thereby identifying to the user the e-mail handling rule 52B that caused the user interface dialog box 30 to be displayed.

The user interface dialog box 50 also provides functionality for modifying or deleting the e-mail handling rule 52B that caused that user interface dialog box 30 to be displayed. In particular, the text box 58 includes text 56 that sets forth the various conditions and actions to be performed for the selected rule. For instance, in the example shown in FIG. 4, if a message is received from a sender named "Chaitanya Sareen", the dialog box 30 shown in FIG. 3 is displayed. A user may edit both the conditions and actions to be performed for the selected rule by editing the contents of the text box 58.

The user interface dialog box 50 also provides functionality for adding new e-mail handling rules, for modifying an e-mail handling rule, for copying a rule, for deleting a rule, and for executing a selected rule. These functions are made available in response to the selection of one of the user interface buttons 62B-62E, respectively. The user interface dialog box 50 also includes a "cancel" user interface button 62 for abandoning any changes made to the e-mail handling rule 52B and an "ok" user interface button 60 for dismissing the dialog box 50 and accepting any changes. If either of the user interface buttons 60 or 62 are selected, the routine 200 continues from operation 214 to operation 216, where it ends.

It should be appreciated that although the invention is described in the context of e-mail message and rules designed to perform actions with respect to e-mail messages, any type of communication, such as instant messaging communications, may benefit from the invention as described herein. Moreover, although the indications provided to users are described herein as being displayed in dialog boxes, any type of user interface object may be utilized to provided such an indication. For instance, windows, alerts, text messages, and other types of user interface devices may be utilized to provide an indication to a user. Additionally, it should be appreciated that the user interfaces described herein are merely illustrative and that other types of user interfaces may be utilized without departing from the spirit and scope of the invention.

Based on the foregoing, it should be appreciated that the various embodiments of the invention include a method, system, apparatus, and computer-readable medium for identifying to a user the cause of an event that has occurred within a compute system. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for identifying to a user a cause of an event occurring within a personal information manager, the method comprising:

maintaining at the personal information manager a plurality of rules comprising at least one condition and at least one action that is performed when the at least one condition is satisfied, wherein the at least one condition comprises receiving at least one electronic mail message and wherein the at least one action comprises displaying a first user interface dialog box indicating that the at least one electronic mail message has been received, wherein the plurality of rules comprise at least one default rule provided with the personal information manager;

performing an evaluation to determine whether the at least one condition is satisfied, wherein performing the evaluation comprises performing the evaluation when the at least one electronic mail message has been received;

performing the at least one action in response to determining that the at least one condition is satisfied;

receiving a request to identify a cause of the performance of the at least one action; and in response to receiving the request, identifying at least one rule of the plurality of rules to the user, wherein identifying the at least one rule of the plurality of rules to the user comprises:

receiving a selection in the first dialog box identifying the at least one rule of the plurality of rules, wherein the received selection is operative to indicate the user has selected the identified at least one rule of the plurality of rules for editing, wherein the at least one rule of the plurality of rules the user has selected for editing is highlighted, and in response to receiving the selection in the first dialog box, displaying a second user interface dialog box comprising:

a listing of the at least one electronic message indicating the at least one condition that has been satisfied, the listing of the at least one electronic message identifying at least one of the following: a sender of the at least one electronic message, a time the at least one electronic message was received, and a subject of the at least one electronic mail message, and a text box containing the listing, the text box configured to allow the user to edit the at least one rule of the plurality of rules.

2. The method of claim 1, wherein receiving the request to identify the cause of the performance of the at least one action comprises receiving a selection of a user interface object in the first dialog box.

3. A computer-readable storage medium having stored thereon computer-readable instructions which, when executed by a computer, cause the computer to perform the method of claim 1.

4. A computer-controlled apparatus comprising a memory operatively coupled to a processor capable of performing the method of claim 1.

5. A method for identifying to a user a cause of an event occurring within a personal information manager, the method comprising:

providing within the personal information manager a facility for defining a plurality of rules related to the handling of at least one electronic mail message, each rule comprising at least one condition and at least one action to be performed when the at least one condition is satisfied, wherein the plurality of rules comprise at least one default rule provided with the personal information manager;

allowing a user to define, through the facility, at least one rule of the plurality of rules operative to cause a first indication to be displayed in response to receiving the at least one electronic mail message that satisfies the at least one condition associated with the defined at least one rule;

providing within the first indication a first object configured to retrieve an identity of the at least one rule operative to have caused a display of the first indication, wherein the first indication comprises a listing of the at least electronic mail message, the listing of the at least one electronic message identifying at least one of the following: a sender of the at least one electronic message, a time the at least one electronic message was received, and a subject of the at least one electronic mail message, wherein the at least electronic mail message is selectable as at least one selected message, and wherein the first object is configured to retrieve the identity of the at least one rule of the plurality of rules that caused the first indication to be displayed for the at least one selected message, wherein the at least one rule of the plurality of rules that causes the first indication be displayed is highlighted; and receiving a selection of the first object and, in response thereto, displaying a second indication that identifies the at least one rule, wherein the second indication further comprises a second object which, when selected, provides a text box containing the listing, the text box being configured to allow the user to edit the at least one rule.

6. The method of claim 5, wherein the first indication further comprises a third object that, when selected, will open the at least one selected message for viewing.

7. The method of claim 6, wherein the first indication further comprises a fourth object which, when selected, will dismiss the first indication.

8. A computer-readable storage medium having stored thereon computer-readable instructions which, when executed by a computer, cause the computer to perform the method of claim 5.

9. A computer-controlled apparatus comprising a memory operatively coupled to a processor capable of performing the method of claim 5.

10. A method for identifying to a computer user a cause of an event occurring within an electronic mail message client, the method comprising:

storing within the electronic mail message client at least one user-defined message handling rule and at least one administrator-defined message handling rule, the at least one user-defined message handling rule and the at least one system administrator-defined message handling rule being operative to generate a first indication message in response to receiving, at the electronic mail message client, at least one electronic mail message satisfying at least one condition associated with one of the at least one user-defined message handling rule and the at least one system administrator-defined message handling rule, wherein the at least one condition is based on at least one of the following: a sender of the at least one electronic mail message, a recipient of the at least one electronic mail message, a subject of the at least one electronic mail message, and a content of the at least one electronic mail message;

receiving the at least one electronic mail message;

in response to receiving the at least one electronic mail message, performing an evaluation to determine if the at least one condition is satisfied by the received at least one electronic mail message;

generating the first indication message in response to determining that the at least one condition is satisfied by the received at least one electronic mail message;

receiving a request to identify one of the at least one user-defined message handling rule and the at least one system administrator-defined message handling rule that caused the first indication message to be displayed, wherein the request to identify the one rule that caused the first indication message to be displayed comprises displaying a user interface object containing a listing of the at least one electronic message that satisfies the one rule; and in response to the request, generating a second indication message identifying the one rule that caused the first indication message to be displayed, wherein the second indication message further comprises a text box containing the listing, the listing of the at least one electronic message identifying at least one of the following: a sender of the at least one electronic message, a time the at least one electronic message was received, and a subject of the at least one electronic mail message, the text box configured to allow the user to edit the one rule that caused the first indication message to be displayed and wherein the rule that caused the first indication message to be displayed is highlighted.

11. The method of claim 10, wherein the first indication message comprises information related to the received at least one electronic mail message.

12. The method of claim 1, wherein the at least one condition is based on at least one of the following: a sender of the at least one electronic mail message, a recipient of the at least one electronic mail message, a subject of the at least one electronic mail message, and a content of the at least one electronic mail message.

13. The method of claim 1, wherein the at least one action comprises at least one of the following: moving the at least one electronic message, deleting the at least one electronic message, and displaying the at least one electronic message.

14. The method of claim 5, wherein the at least one condition is based on at least one of the following: a sender of the at least one electronic mail message, a recipient of the at least one electronic mail message, a subject of the at least one electronic mail message, and a content of the at least one electronic mail message.

15. The method of claim 5, wherein the at least one action comprises at least one of the following: moving the at least one electronic message, deleting the at least one electronic message, and displaying the at least one electronic message.

16. The method of claim 1, wherein performing the evaluation to determine whether the at least one condition is satisfied comprises performing the evaluation periodically.

17. The method of claim 5, further comprising periodically evaluating the plurality of rules to determine whether the at least one condition associated with the plurality of rules has been satisfied.

18. The method of claim 10, wherein performing the evaluation to determine whether the at least one condition is satisfied by the received at least one electronic mail message comprises performing the evaluation periodically.

19. The method of claim 1, wherein the first dialog box is operative to cause a performance of at least one of the following: add a new rule to the plurality of rules, copy the at least one rule from the plurality of rules, delete the at least one rule from the plurality of rules, and execute the at least one rule of the plurality of rules.

20. The method of claim 5, wherein the first object is operative to cause a performance of at least one of the following: add a new rule to the plurality of rules, copy the at least one rule from the plurality of rules, delete the at least one rule from the plurality of rules, and execute the at least one rule of the plurality of rules.

* * * * *